(12) United States Patent
Angel et al.

(10) Patent No.: US 10,174,679 B2
(45) Date of Patent: Jan. 8, 2019

(54) SYSTEMS AND METHODS RELATED TO CONTROL OF GAS TURBINE STARTUP

(71) Applicant: General Electric Company, Schenectady, NY (US)

(72) Inventors: Mathew Doyle Angel, Greenville, SC (US); Michael John Carney, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 15/455,173

(22) Filed: Mar. 10, 2017

(65) Prior Publication Data

US 2018/0003111 A1 Jan. 4, 2018

Related U.S. Application Data

(60) Provisional application No. 62/356,106, filed on Jun. 29, 2016.

(51) Int. Cl.
*F02C 7/26* (2006.01)
*G05B 19/042* (2006.01)
*F02C 9/00* (2006.01)
*F01D 19/00* (2006.01)

(52) U.S. Cl.
CPC .............. *F02C 7/26* (2013.01); *F01D 19/00* (2013.01); *F02C 9/00* (2013.01); *G05B 19/042* (2013.01); *G05B 19/0426* (2013.01); *F05D 2260/85* (2013.01); *F05D 2270/304* (2013.01)

(58) Field of Classification Search
CPC . F02C 7/26; F02C 9/00; G05B 19/042; G05B 19/0426; F01D 19/00; F05D 2270/304; F05D 2260/85
USPC ........................................................ 700/286
See application file for complete search history.

(56) References Cited

U.S. PATENT DOCUMENTS 8,333,085 B2    12/2012 Hipp-Kalthoff et al.
2017/0233103 A1*  8/2017 Teicholz ............... B64D 27/16
                                              701/100

* cited by examiner

*Primary Examiner* — Robert E Fennema
*Assistant Examiner* — Jigneshkumar C Patel
(74) *Attorney, Agent, or Firm* — Mark E. Henderson; Ernest G. Cusick; Frank A. Landgraff

(57) ABSTRACT

A method of controlling a startup sequence of a gas turbine. A turbine of the gas turbine may include a rotor that has a rotor velocity and a rotor acceleration during the startup sequence. The method may include the steps of: determining an originally scheduled startup duration for the gas turbine; measuring an intermediate rotor velocity at an intermediate time within the startup sequence; determining a recalculated remaining startup duration that is a duration calculated as necessary to achieve the final rotor velocity given the intermediate rotor velocity; determining a remaining portion of the originally scheduled startup duration based on the intermediate time; calculating a time multiplier based on a comparison of the recalculated remaining startup duration to the remaining portion of the originally scheduled startup duration; and scaling the rotor acceleration per the time multiplier for a duration until the final rotor velocity is achieved by the turbine.

20 Claims, 5 Drawing Sheets

SYSTEMS AND METHODS RELATED TO CONTROL OF GAS TURBINE STARTUP

CROSS-REFERENCE TO RELATED APPLICATIONS

This application claims priority to U.S. Provisional Patent Application No. 62/356,106 entitled "SYSTEMS AND METHODS RELATED TO CONTROL OF GAS TURBINE STARTUP" filed on Jun. 29, 2016; which provisional application is incorporated herein by reference in its entirety; this application claims the benefit of the provisional's filing date under 35 U.S.C. 119(e).

BACKGROUND OF THE INVENTION

This present application relates to startup control of gas turbine engines. More specifically, but not by way of limitation, the present application relates to methods and systems for modulating turbine rotor acceleration/velocity in the startup of a gas turbine based on a subsequently made calculation of the remaining time until the startup sequence is completed.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the gas turbine. Within the turbine, the working fluid is redirected by the stator blades onto the rotor blades so to power rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, rotate the coils of a generator so to generate electrical power.

Many industrial applications, such as those involving power generation and aviation, still rely heavily on gas turbines, and, because of this, the engineering of more efficient engines remains an ongoing and important objective. As will be appreciated, even incremental advances in machine performance, efficiency, or cost-effectiveness are meaningful in the highly competitive marketplace that has evolved around this technology.

Related to startup operation for gas turbines and the control thereof, conventional systems and methods generally are based on defined schedules that depend upon various engine startup parameters, such as, for example, minimum/maximum fuel flow, rotor acceleration and velocity, and/or applied torque. These predefined schedules, thus, define startup characteristics for gas turbines, with certain of these startup parameters being controlled to follow paths that are predefined or fixed as part of schedules. An example of one of these predefined schedules, as discussed in more detail below, is one that defines rotor acceleration per rotor velocity. In practice, however, the startup of gas turbines regularly deviates from these nominal schedules. This, for example, may be due to variations in ambient conditions, fuel, poor closed-loop control tracking of the schedules, and/or varying performance from components or subsystems of the engine.

More specifically, gas turbine startup operation is significantly influenced by the manner in which rotor acceleration is controlled relative to rotor velocity. As will be appreciated, closed-looped control systems typically control rotor acceleration during startup operation in accordance with a schedule where rotor acceleration is a function of rotor velocity. Unfortunately, conventional startup methods and systems lack the functionality to accommodate unforeseen deviations or delays that regularly occur during the startup sequence, and these cause the duration of the process to deviate from what was originally expected or scheduled at initiation. Consequently, once deviations from the schedule occur, there is no efficient manner by which to correct or account for them. Specifically, for example, if a deviation results in the startup operation falling behind schedule, conventional methods and systems lack an efficient way by which such lost time may be "made up", and, as would be expected, this often results startup durations that significantly vary from one occasion to the next.

These variations in startup duration negatively impact aspects of gas turbine operation and performance, as well as cost-effectiveness. For example, among other potential issues, such variations decrease component life and/or affect blade tip clearances. Further, guaranteeing startup duration for gas turbines is becoming a common contractual requirement in today's commercial environment, making such durational uncertainty highly undesirable. One approach that is commonly used to address such variation is to just include wide margins in the time allotted for engine startup. Such an approach, however, is generally undesirable due to the inefficiencies and unnecessary delays that often result. Thus, improved gas turbine startup control systems and/or methods, which provide for guaranteed startup durations with reduced margins and/or overcome any of the other above-mentioned disadvantages, would have commercial value.

BRIEF DESCRIPTION OF THE INVENTION

The present application thus describes a method of controlling a startup sequence of a gas turbine, that includes a compressor, a combustor, and, drivingly coupled to the compressor, a turbine. The turbine may include a rotor that has a rotor velocity and a rotor acceleration during the startup sequence. The method may include the steps of: determining an originally scheduled startup duration for the gas turbine, the originally scheduled startup duration including a calculated duration for the startup sequence given: a) an initial rotor velocity at a beginning of the startup sequence; and b) a final rotor velocity at an end of the startup sequence; initializing the beginning of the startup sequence by applying a startup torque to the rotor; measuring an intermediate rotor velocity at an intermediate time within the startup sequence; determining a recalculated remaining startup duration that is a duration calculated as necessary to achieve the final rotor velocity given the intermediate rotor velocity; determining a remaining portion of the originally scheduled startup duration based on the intermediate time; calculating a time multiplier based on a comparison of the recalculated remaining startup duration to the remaining portion of the originally scheduled startup duration; and scaling the rotor acceleration per the time multiplier for at least a portion of a duration until the final rotor velocity is achieved by the turbine.

The present application further describes a system that includes a gas turbine that has a compressor, a combustor, and, drivingly coupled to the compressor, a turbine. The turbine may include a rotor that has a rotor velocity and a rotor acceleration during the startup sequence. The gas turbine may further include a control system for controlling an operation thereof. The control system may include: a hardware processor; and a machine readable storage medium on which is stored instructions that cause the hardware processor to execute a process related to control of the gas turbine. The process may include: determining an originally scheduled startup duration for the gas turbine, the originally scheduled startup duration including a calculated duration for the startup sequence given: a) an initial rotor velocity at a beginning of the startup sequence; and b) a final rotor velocity at an end of the startup sequence; initializing the beginning of the startup sequence by applying a startup torque to the rotor; measuring an intermediate rotor velocity at an intermediate time within the startup sequence; determining a recalculated remaining startup duration that is a duration calculated as necessary to achieve the final rotor velocity given the intermediate rotor velocity; determining a remaining portion of the originally scheduled startup duration based on the intermediate time; calculating a time multiplier based on a comparison of the recalculated remaining startup duration to the remaining portion of the originally scheduled startup duration; and scaling the rotor acceleration per the time multiplier for at least a portion of a duration until the final rotor velocity is achieved by the turbine.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
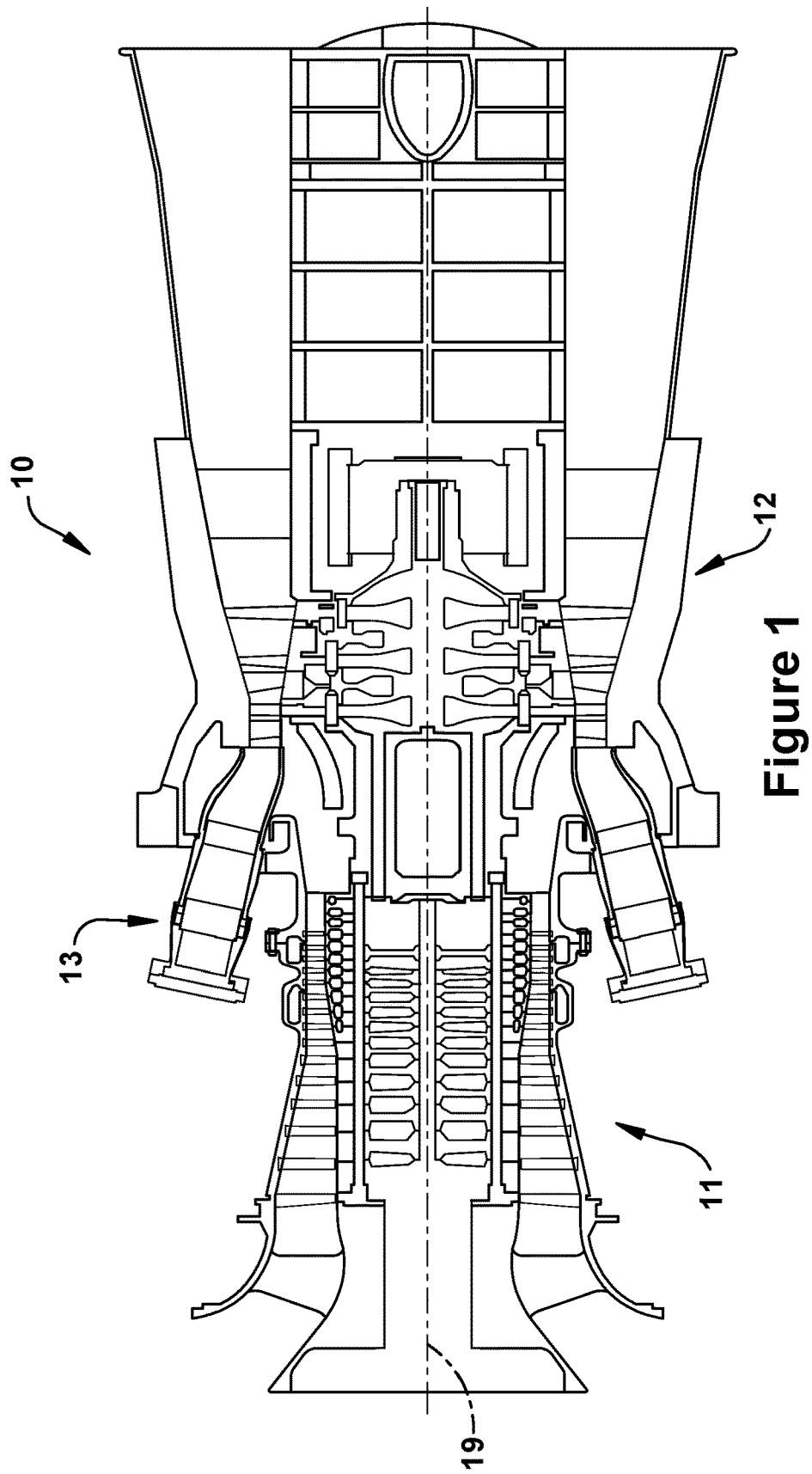
FIG. 1 is a schematic representation of an exemplary gas turbine with which embodiments of the present invention may be used.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

By way of background, referring now with specificity to the figures, FIG. 1 illustrates an exemplary gas turbine in accordance with the present invention or within which the present invention may be used. It will be understood by those skilled in the art that the present invention may not be limited to this type of usage, and that the examples are not meant to be limiting unless otherwise stated. FIG. 1 is a schematic representation of a gas turbine 10. In general, gas turbines operate by extracting energy from a pressurized flow of hot gas produced by the combustion of fuel in a stream of compressed air. As illustrated in FIG. 1, the gas turbine 10 includes an axial compressor 11 that is mechanically coupled by a common shaft or rotor to a downstream turbine section or turbine 12, with a combustor 13 being positioned between the compressor 11 and the turbine 12. As illustrated in FIG. 1, the gas turbine may be formed about a common central axis 19.

In one example of gas turbine operation, the rotation of compressor rotor blades within the axial compressor 11 compresses a flow of air. In the combustor 13, energy is released when the compressed air is mixed with a fuel and ignited. The resulting flow of hot gases or "working fluid" from the combustor 13 is then directed over rotor blades within the turbine, which induces the rotation of the blades about the shaft. In this way, the energy of the flow of working fluid is transformed into the mechanical energy of the rotating blades and, given the connection between the rotor blades and the shaft, the rotating shaft. The mechanical energy of the shaft then may be used to drive the rotation of the compressor rotor blades, such that the necessary supply of compressed air is produced, and, for example, the coils of a generator to produce electricity.

Figure 2:
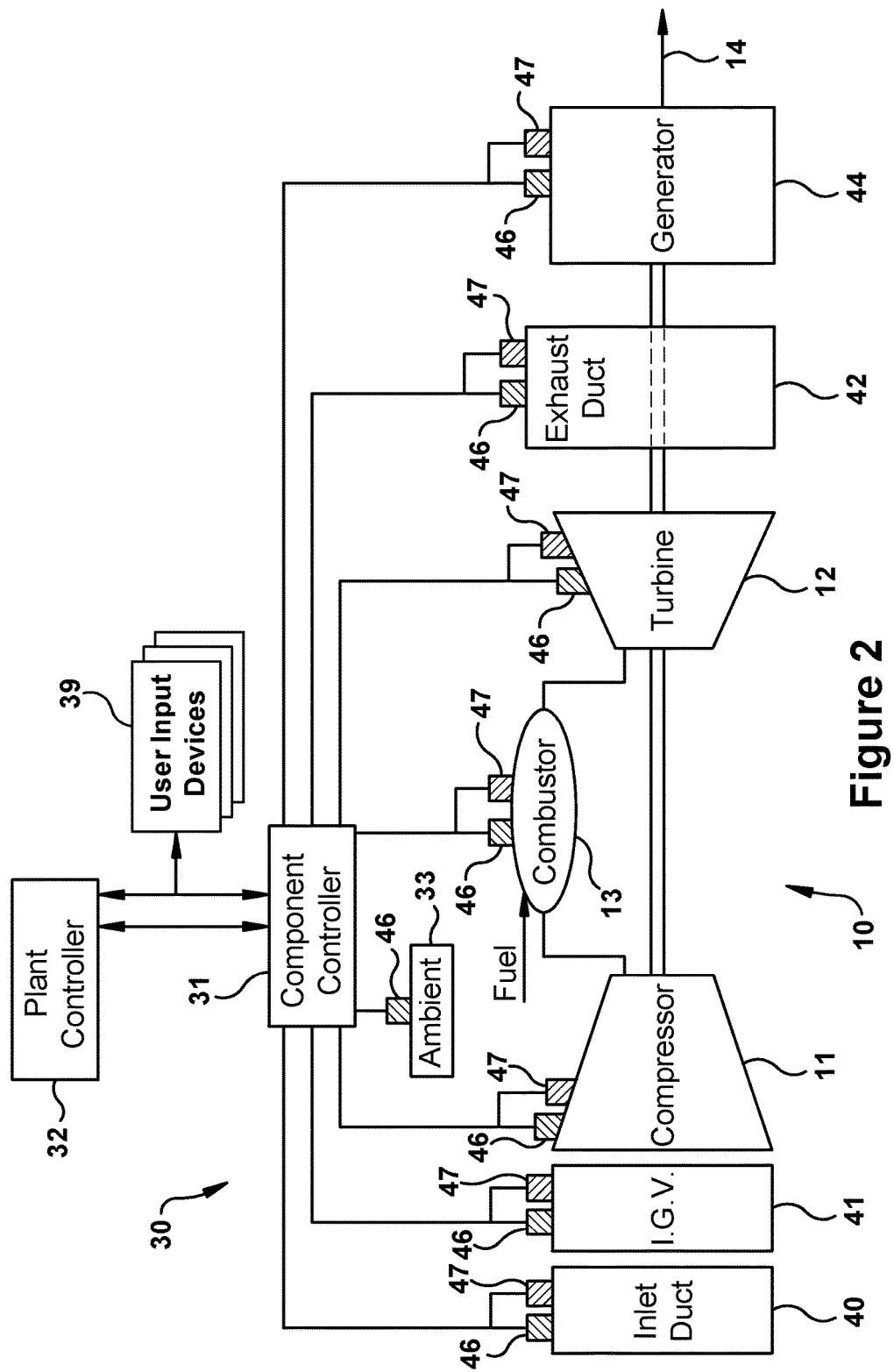
FIG. 2 illustrates a schematic diagram of an exemplary gas turbine system with controllers in accordance with aspects and exemplary embodiments of the present invention.

FIG. 2 is a schematic diagram of an exemplary gas turbine and control system—referred to collectively herein as a gas turbine system 30—aspects of which may be used in accordance with or to enable embodiments of the present invention. As discussed above, the gas turbine system 30 includes a gas turbine 10 having a compressor 11 and a combustor 13, as well as a turbine 12 that is drivingly coupled to the compressor 11. The gas turbine system 30 may further include a component controller 31 that controls the operation of the gas turbine 10. In cases where the gas turbine system 30 is part of a power plant having more power generating assets, the component controller 31 may connect to a plant controller 32, each of which may connect to a user input device 39 for receiving communications from a user or operator. Alternatively, it will be appreciated that the component controller 31 and the plant controller 32 may be combined into a single controller. As also shown, the gas turbine system 30 may include an inlet duct 40 that channels ambient air into the compressor 11. Injected water and/or other humidifying agent may be channeled to the compressor 11 through the inlet duct 40. The inlet duct 40 may have filters, screens and sound absorbing devices that contribute to a pressure loss of ambient air flowing through the inlet duct 40. From the inlet duct 40, the air may flow through inlet guide vanes 41 of compressor 11. As further illustrated, the gas turbine system 30 may include an exhaust duct 42 that channels combustion gases from an outlet of turbine 12 through, for example, emission control and sound absorbing devices. Further, the turbine 12 may drive a generator 44 that produces electrical power.

As part of the gas turbine system 30, several sensors 46 may be included that monitor the operation of the gas turbine 10 by detecting or measuring various operating conditions or parameters throughout the system, including, for example, conditions within the compressor 11, combustor 13, turbine 12, generator 44, as well as the ambient environment 33. For example, the sensors 46 may include temperature sensors that monitor ambient temperature, compressor discharge temperature, turbine exhaust temperature, and other temperatures along the flow path of the working fluid within the gas turbine 10. Further, the sensors 46 may include acoustic or pressure sensors that monitor ambient pressure, static and dynamic pressure levels at the compressor inlet, compressor outlet, turbine exhaust, and at other suitable locations within the gas turbine 10. The sensors 46 also may include humidity sensors, such as wet and dry bulb thermometers, that measure ambient humidity in the inlet duct of the compressor 11. The sensors 46 also may include flow sensors, velocity sensors, acceleration sensors, flame detector sensors, valve position sensors, guide vane angle sensors and any other sensors that are typically used to measure various operating parameters and conditions relative to the operation of the gas turbine system 30. As used herein, the term "parameter" refers to measurable physical properties of operation which may be used to define operating conditions within a system, such as gas turbine system 30 or other system described herein. Such operating parameters may include temperature, pressure, humidity and gas flow characteristics at locations defined along the path of the working fluid, as well as ambient conditions, fuel characteristics, and other measurables as may be suitable.

It will be appreciated that gas turbine system 30 also may include several actuators 47 by which control of the gas turbine 10 is achieved. For example, the actuators 47 may include electro-mechanical devices having variable setpoints or settings that allow the manipulation of certain process inputs (i.e., manipulated variables) for the control of process outputs (i.e., controlled variables) in accordance with a desired result or mode of operation. For example, commands generated by the component controller 31 may cause one or more actuators 47 within the turbine system 30 to adjust valves between the fuel supply and combustor 13 that regulate the flow level, fuel splits, and/or type of fuel being combustor. As another example, commands generated by control system 31 and/or plant controller 32 may cause one or more actuators to adjust an inlet guide vane setting that alters their angle of orientation. In addition, commands generated by the component controller 31 may control a startup operation or sequence, including rotational velocities and acceleration of the rotor of the turbine 12 and/or compressor 11.

The component controller 31 may be a computer system having a processor that executes program code to control the operation of the gas turbine system 30 using sensor measurements and actuators, and/or instructions received from an operator. As discussed in more detail below, software executed by the controller 31 may include scheduling algorithms for regulating any of the subsystems described herein. The component controller 31 may regulate gas turbine 10 or gas turbine system 30 based, in part, on algorithms stored in its digital memory. These algorithms, for example, may enable the component controller 31 to maintain the NOx and CO emissions in the turbine exhaust to within certain predefined emission limits, or, in another instance, maintain the combustor firing temperature to within predefined limits. It will be appreciated that algorithms may include inputs for parameter variables such as compressor pressure ratio, ambient humidity, inlet pressure loss, turbine exhaust backpressure, as well as any other suitable parameters. The schedules and algorithms executed by the component controller 31 may accommodate variations in ambient conditions that affect emissions, combustor dynamics, firing temperature limits at full and part-load operating conditions, etc. As discussed in more detail below, the component controller 31 may apply algorithms for scheduling the gas turbine, such as those settings relating to desired turbine exhaust temperatures and combustor fuel splits, with the objective of satisfying performance objectives while complying with operability boundaries of the engine. For example, the component controller 31 may determine combustor temperature rise and NOx during part-load operation in order to increase the operating margin to the combustion dynamics boundary and thereby improve operability, reliability, and availability of the generating unit. In accordance with aspects of the present invention, as discussed more below, the component controller 31 may determine startup parameters, such as rotor velocity and rotor acceleration of the turbine 12, and control the startup process of the gas turbine 10 according to a desired schedule or as otherwise described herein.

Turning now to the present invention, systems and methods are disclosed that, for example, may be used to control of a startup operation or sequence of a gas turbine. While the present disclosure is made with reference to gas turbines, those of ordinary skill in the art, should understand that, by using the disclosures provided herein, the present invention may not be limited to gas turbine startup control and may be applicable to other industrial technologies and engine types. As will be seen, embodiments of the present disclosure may use a scaling coefficient or multiplier to reduce variation in the duration of startup sequences, without introducing additional control response or stability issues. Thus, during the startup sequence, current data relating to operating parameters may be used to make real time adjustments so that the startup operation is completed in accordance with the originally scheduled duration that was calculated at the beginning of the sequence. This originally scheduled duration is one that will be referred to herein as the "originally scheduled startup duration". One advantage of the present invention, as will be discussed below, is that adjustments to the control schedule may be efficiently made via a calculated scaling factor or time multiplier (hereinafter "time multiplier") such that additional control loops are unnecessary. Thus, as will be seen, embodiments of the present disclosure may be implemented with relatively minor additions to the existing startup control structure of the gas turbine. Further, because adjustments to startup parameters are made with consideration of the cumulative effect upon the completion of the startup process, required control adjustments may be advantageously limited.

Figure 3:
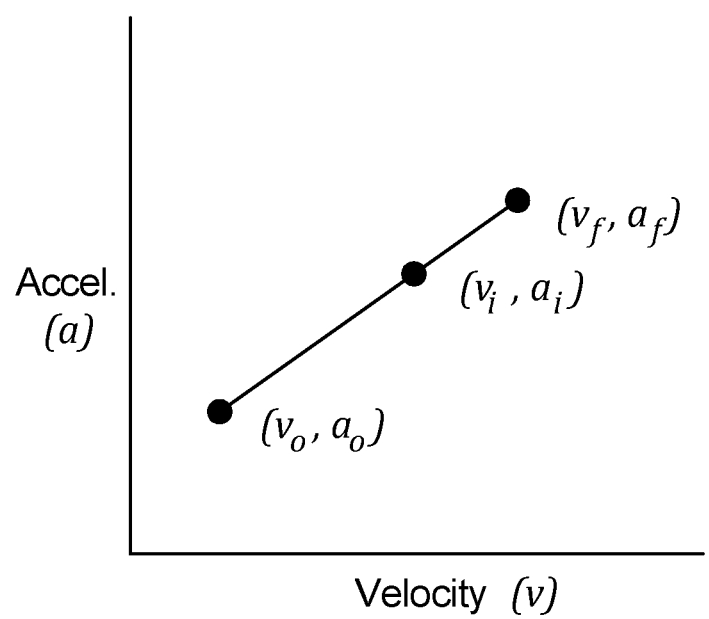
FIG. 3 illustrates an exemplary plot by which to determine a time estimation related to the startup of a gas turbine in accordance with exemplary embodiments of the present invention.
Figure 4:
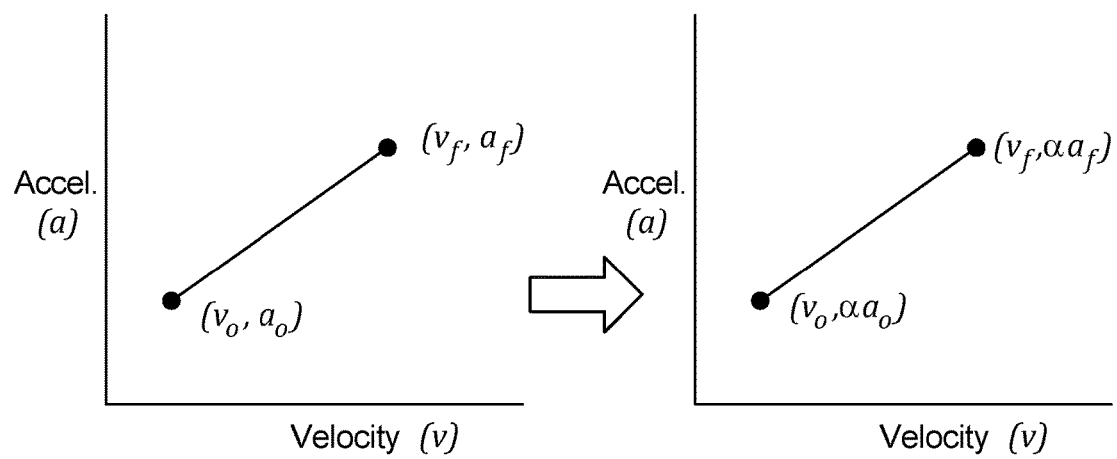
FIG. 4 illustrates an exemplary plot by which to calculate a time multiplier related to the startup of a gas turbine in accordance with exemplary embodiments of the present invention.

More specifically, with reference now generally to FIGS. 3 and 4, the present invention includes control methods and systems that enable adjusting startup operations of a gas turbine based on a time or duration that remains for satisfying the originally scheduled startup duration. As mentioned, many conventional system and methods related to startup operation, control rotor acceleration per a schedule where rotor acceleration is a function of rotor velocity. This type of schedule will be referred to herein as a "rotor acceleration versus velocity schedule." According to exemplary embodiments, the present invention, thus, operates by scaling, in real time, the rotor acceleration versus velocity schedule for closed-loop control of rotor acceleration in order to satisfy the originally scheduled startup duration. This scaling, for example, may be necessary to account for unforeseen delays caused by changing operating conditions, poor closed-loop tracking to the rotor acceleration versus velocity schedule, or other issues. Thus, according to exemplary embodiments, the time multiplier may be based on current conditions data relating to the progress of a startup sequence, for example, a current rotor velocity of the turbine.

Thus, as discussed in more detail below, the time multiplier may be equal to a comparison of a recalculated remaining startup duration to a remaining portion of the originally scheduled startup duration. As used herein, the recalculated remaining startup duration represents the recalculated remaining time until the startup operation achieves a final rotor velocity, where the recalculation is: 1) made at an intermediate time (i.e., subsequent to the beginning but before the end of the current startup sequence); and 2) based on a rotor velocity that is measured at that intermediate time. As used herein, the final rotor velocity refers to a turbine rotor velocity that, once attained, signifies that startup operations have been successfully completed, i.e., brought the turbine to the operating rotor velocity defined at the initiation of the startup sequence. As will be appreciated, the startup sequence is considered complete once the final rotor velocity is reached. The recalculated remaining startup duration may be calculated by determining the amount of time required to accelerate from the currently measured rotor velocity (at the intermediate time) to the final rotor velocity based on the aforementioned rotor acceleration versus velocity schedule. The remaining portion of the originally scheduled startup duration, as the name implies, refers to the portion of the originally scheduled startup duration that remains given the timing of the intermediate time. Put another way, the remaining portion of the originally scheduled startup duration refers to the originally scheduled startup duration minus an elapsed portion thereof. That is, the elapsed portion, as used herein, refers to the portion of the originally scheduled startup duration that already has elapsed since the beginning of the startup sequence given the timing of the intermediate time.

For example, with particular reference to FIG. 3, an exemplary "rotor acceleration versus rotor velocity" plot is schematically shown that represents a startup operation of a gas turbine. As shown, the plot of FIG. 3 references the following: an original rotor velocity and acceleration ($v_0$, $\alpha_0$), which, respectively, refer to the rotor velocity and acceleration of the turbine at the beginning of the startup sequence; a final rotor velocity and acceleration ($v_f$, $\alpha_f$), which, respectively, refer to the rotor velocity and acceleration at the successful completion of the startup sequence; and a current or intermediate rotor velocity and acceleration ($v_i$, $\alpha_i$), which, respectively, refer to the rotor velocity and acceleration at some current or intermediate time that occurs subsequent to the original rotor velocity and acceleration ($v_0$, $\alpha_0$) but before the gas turbine attains the final rotor velocity and acceleration ($v_f$, $\alpha_f$). Thus, as will be appreciated, given the predefined rotor acceleration versus velocity schedule, where rotor acceleration is a function of velocity, the originally scheduled startup duration is the time required for the turbine to reach the final rotor velocity ($v_f$) given the initial rotor velocity ($v_0$). The originally scheduled startup duration, which is referred to in the below equations as "$T_{SCH}$", may be calculated by integrating the multiplicative inverse of the rotor acceleration function between the initial rotor velocity ($v_0$) and the final velocity ($v_f$), as given by the following equations:

$$\frac{dV}{dt} = f(V) \text{ where } v_0 \leq V \leq v_f$$

$$\frac{dV}{f(V)} = dt \text{ where } v_0 \leq V \leq v_f$$

$$\int_{v_0}^{v_f} \frac{dV}{f(V)} = \int_{t_o}^{t_f} dt \text{ where } v_0 \leq V \leq v_f$$

$$T_{SCH} = t_f - t_0 = \int_{v_0}^{v_f} \frac{dV}{f(V)}$$

Similarly, as will be further appreciated, given the rotor acceleration versus velocity schedule, the recalculated remaining startup duration is the time required to reach the final rotor velocity ($v_f$) given a current velocity ($v_i$) at an intermediate time, which is a point in time that is subsequent to the beginning of the startup sequence. The recalculated remaining startup duration may be calculated by integrating the multiplicative inverse of the rotor acceleration function between the current rotor velocity ($v_i$) and the final velocity ($v_f$), as given by the following equations:

$$\frac{dV}{dt} = f(V)$$

-continued $$\frac{dV}{f(V)} = dt$$

$$\int_{v_i}^{v_f} \frac{dV}{f(V)} = \int_{t_i}^{t_f} dt$$

$$T_{Recalc} = t_f - t_i = \int_{v_i}^{v_f} \frac{dV}{f(V)}$$

In these example equations, as should be understood, Equation 1 describes a turbine rotor acceleration profile as a function of velocity, as may be used as a reference schedule in closed-loop acceleration control during a gas turbine startup sequence. In Equation 2, the variables of Equation 1 are separated in preparation for integration. Equation 3, as will be appreciated, represents the integration of Equation 2, in which: the upper and lower limits of integration of the left-hand-side of the equation are the final rotor velocity ($v_f$) and the intermediate or current velocity ($v_i$), respectively; and the upper and lower limits of integration of the right-hand-side of the equation are the final time ($t_f$) and a current or intermediate time ($t_i$), respectively. Finally, Equation 4 provides an exemplary calculation for determining the recalculated remaining startup duration (referred to in the equations as "$T_{Recalc}$"), which, as stated, is the recalculated time remaining until the final rotor velocity is achieved given a current status of the rotor velocity.

With particular reference now to FIG. 4, exemplary plots are provided pertaining to the calculation of the time multiplier (given below as "$\alpha$"), which is described in further detail with reference to FIG. 5. As should be appreciated, in a closed-loop acceleration control system where rotor acceleration is scheduled as a function of velocity, the recalculated remaining startup duration from a known rotor velocity (i.e., current velocity ($v_i$)) to the final velocity ($v_f$) may be estimated via the exemplary calculations and/or the rotor acceleration versus velocity schedule discussed above. To calculate the time multiplier, the recalculated remaining startup duration ($T_{Recalc}$) may be compared to a remaining portion of the originally scheduled startup duration (which is a duration referred to in the following equation as "$T_{SCH\ rem}$") to provide the following ratio:

$$\alpha = \frac{T_{Recalc}}{T_{SCH\ rem}}$$

As provided in the following equation, the remaining portion ($T_{SCH\ rem}$) of the originally scheduled startup duration is defined as the difference between: a) the originally scheduled startup duration (i.e., "$T_{SCH}$" or the duration of the startup sequence as originally calculated at the beginning ($t_0$) of the startup sequence); and b) the elapsed portion (referred to below as "$T_{SCH\ elap}$") of the originally scheduled startup duration, which, as used herein, is the portion of the originally scheduled startup duration that has elapsed given the current or intermediate time. Thus, the remaining portion of the originally scheduled startup duration may be expressed as:

$$T_{SCH\ rem} = T_{SCH} - T_{SCH\ elap}$$

Thus, the time multiplier ($\alpha$) becomes:

$$\alpha = \frac{T_{Recalc}}{T_{SCH} - T_{SCH\ elap}}$$

As will be appreciated, the time multiplier may be used to scale the rotor acceleration versus velocity schedule such that the startup sequence is adjusted so that it still adheres in durational outcome to the originally scheduled startup duration. That is, the time multiplier may be employed to account or make up for deviations and delays that had occurred between the beginning of the startup sequence and the intermediate time. According to other embodiments, the time multiplier may be used to scale fuel schedules or torque request.

Figure 5:
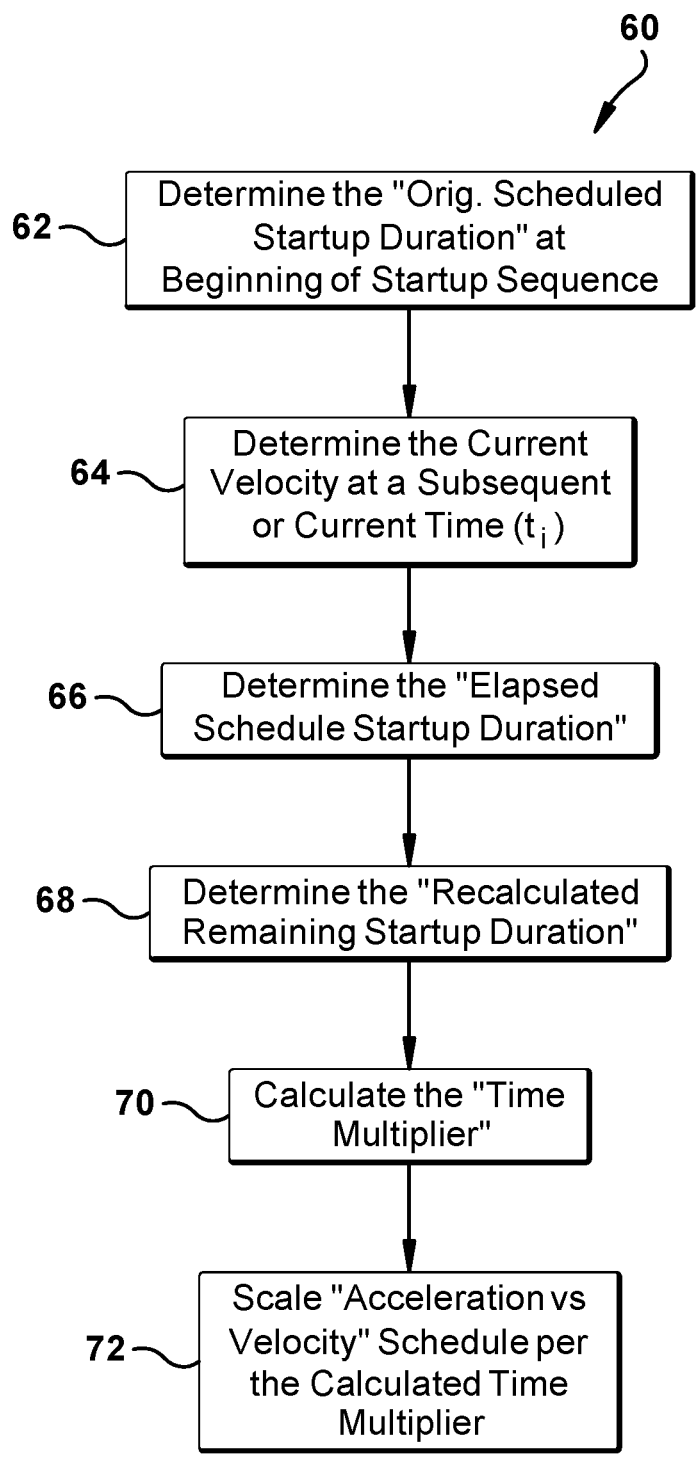
FIG. 5 illustrates an exemplary logic flow or process related to the startup of a gas turbine in accordance with exemplary embodiments of the present invention.

With reference now to FIG. 5, an exemplary process 60 is shown that is in accordance with embodiments of the present invention for controlling a startup sequence of a gas turbine. As provided, at an initial step 62, the process may begin by determining what is introduced above as the originally scheduled startup duration (or "$T_{SCH}$") for a startup sequence of a gas turbine. This step may be completed just before or concurrent with the beginning of the startup sequence, and may reflect a calculated duration of the startup sequence given known initial conditions at the original or beginning time (or "$t_0$") of the startup sequence and the predefined final rotor velocity (or "$t_f$") at the end of the startup sequence. As already described, the originally scheduled startup duration may be determined according to equipment specifications and other data related to the gas turbine, for example, as may be provided by the manufacturer, including reference plots or curves related to rotor acceleration and velocity. More specifically, the originally scheduled startup duration may be calculated, at least in part, via the aforementioned "rotor acceleration versus velocity schedule", and/or may depend on initial operating conditions or parameters as may be known at the beginning of the startup sequence. As already described, the rotor acceleration versus velocity schedule may include a plot of rotor acceleration as a function of velocity that covers a continuous range of rotor velocities, including at least the original or beginning rotor velocity and the final velocity. The startup sequence then may be initialized, for example, by the application of a startup torque to the turbine rotor.

At a step 64, as shown, the process 60 may include determining a current or intermediate rotor velocity of the turbine at a time that is subsequent to the beginning of the startup sequence, which is a point in time that is referred to above as an intermediate time (or "$t_i$"). As stated, the intermediate time represents a point in time occurring within the ongoing startup sequence, i.e., the intermediate time occurs after the beginning of the startup sequence but before the end of the startup sequence.

At step 66, the process 60 may include determining what is referred herein to as the elapsed portion (or "$T_{SCH\ elap}$") of the originally scheduled startup duration. As will be appreciated, this is based on when the intermediate time occurs. Specifically, the elapsed portion of the originally scheduled startup duration represents the amount of the originally scheduled startup duration that has elapsed since the beginning of the startup sequence, and, more particularly, may be defined as the time period occurring between the beginning time of the startup sequence and the intermediate time.

At a step 68, the process 60 may include determining what was introduced above as the recalculated remaining startup duration (or "$T_{Recalc}$"). The recalculated remaining startup duration represents a recalculated duration of time until the final rotor velocity is achieved given the current velocity measured at the intermediate time. The recalculated remaining startup duration may be determined using the same rotor acceleration versus velocity schedule that was previously used to calculate the originally scheduled startup duration.

At a step 70, the process 60 may include calculating the time multiplier (or "α"). As stated, according to a preferred embodiment, the time multiplier may be determined using the following equation:

$$\alpha = \frac{T_{Recalc}}{T_{SCH} - T_{SCH\,elap}}$$

At a step 72, the process 60 may include using the time multiplier to scale the rotor acceleration versus velocity schedule for at least a portion of the remainder of the startup sequence. It should be appreciated that the rotor acceleration versus velocity scheduled that is scaled may be the same schedule used initially to determine the originally scheduled startup duration as well as the schedule by which the startup sequence had been proceeding since the beginning of the startup sequence. Preferably, the process 60 includes using the scaled rotor acceleration versus velocity scheduled for the remainder of the startup sequence. In this manner, for example, in cases where unanticipated delays mean that the recalculated remaining startup duration would result in a startup duration that that exceeds that of the originally scheduled startup duration, the value of the time multiplier will be greater than one. With a value greater than one, the time multiplier operates to increase the rotor acceleration relative to rotor velocity in the scaled schedule for the remainder of the startup period. As will be appreciated, this may function to speed up the startup sequence so that it may still achieve the originally scheduled startup duration, as the increased rotor acceleration rates "make ups" for lost time. Calculated in the manner described herein, the time multiplier is proportional to the magnitude of the delay that needs to be rectified. The process 60 may further include a step (not shown) where a check is performed to determine whether scaling by the time multiplier will result in a violation of any operational boundary of the gas turbine. For instances in which one or more operational boundaries are determined to be violated, for example, the time multiplier may be reduced incrementally until it is determined that the operational boundaries are no longer violated.

In an alternative case—where calculation of the time multiplier reveals a value of less than one—it will be appreciated that the ongoing startup sequence is "ahead of schedule", or, put another way, on pace to achieve the final rotor velocity before the time expected given the originally scheduled startup duration. According to exemplary embodiments, in such cases, a choice may be presented and a decision made as to whether to proceed with the time multiplier, i.e., proceed with scaling the rotor acceleration versus velocity schedule by the time multiplier having a value of less than one. It will be appreciated that scaling by such a time multiplier would operate to decrease the rate of rotor acceleration and, thereby, lengthen the duration of the startup sequence compared to the current pace of the startup sequence. If the decision is made to scale by the time multiplier, then the startup sequence still satisfies the originally scheduled startup duration, while the decreased rate of acceleration over the remainder of the startup sequence may allow for reduced overall wear and tear on the engine. If, on the other hand, the decision is made to forgo scaling by the time multiplier, then the startup sequence will likely proceed such that the final rotor velocity is reached ahead of the original schedule—i.e., in less time than allowed in the originally scheduled startup duration—which may be an advantageous result for a power plant in terms of coming on-line early and/or increasing output during a particular generating cycle.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A method of controlling a startup sequence of a gas turbine, the gas turbine comprising a compressor, a combustor, and, drivingly coupled to the compressor, a turbine, wherein the turbine includes a rotor comprising a rotor velocity and a rotor acceleration during the startup sequence, the method comprising the steps of:

determining an originally scheduled startup duration for the gas turbine, the originally scheduled startup duration comprising a calculated duration for the startup sequence given: a) an initial rotor velocity at a beginning of the startup sequence; and b) a final rotor velocity at an end of the startup sequence;

initializing the beginning of the startup sequence by applying a startup torque to the rotor;

measuring an intermediate rotor velocity at an intermediate time within the startup sequence;

determining a recalculated remaining startup duration, wherein the recalculated remaining startup duration comprises a duration calculated as necessary to achieve the final rotor velocity given the intermediate rotor velocity;

determining a remaining portion of the originally scheduled startup duration based on the intermediate time;

calculating a time multiplier based on a comparison of the recalculated remaining startup duration to the remaining portion of the originally scheduled startup duration; and scaling the rotor acceleration per the time multiplier for at least a portion of a duration until the final rotor velocity is achieved by the turbine.

2. The method according to claim 1, wherein the remaining portion of the originally scheduled startup duration comprises the originally scheduled startup duration minus an elapsed portion thereof.

3. The method according to claim 1, wherein the remaining portion of the originally scheduled startup duration comprises a difference between the originally scheduled startup duration and an elapsed portion of the originally scheduled startup duration, the elapsed portion comprising a duration measured between the beginning of the startup sequence and the intermediate time; and wherein the originally scheduled startup duration is calculated before or concurrent with the beginning of the startup sequence.

4. The method according to claim 3, wherein the initial rotor velocity comprises a velocity of the rotor as determined at the beginning of the startup sequence;
wherein the final rotor velocity comprises a velocity of the rotor that signals the end of the startup sequence; and
wherein the intermediate time represents a point in time occurring within the ongoing startup sequence.

5. The method according to claim 3, wherein the final rotor velocity comprises a rotor velocity associated with a predetermined steady state operating condition for the gas turbine;
wherein the intermediate time comprise one that is subsequent to the beginning of the startup sequence but before the end of the startup sequence; and
wherein the originally scheduled startup duration is determined via a rotor acceleration versus velocity schedule.

6. The method according to claim 5, wherein the rotor acceleration versus velocity schedule comprises a plot of rotor acceleration as a function of rotor velocity, the plot of rotor acceleration as a function of rotor velocity covering at least a continuous range of rotor velocities including at least the initial rotor velocity through the final rotor velocity.

7. The method according to claim 6, wherein the recalculated remaining startup duration is determined via the rotor acceleration versus velocity schedule given the intermediate rotor velocity.

8. The method according to claim 6, wherein the recalculated remaining startup duration is determined by calculating an amount of time required to accelerate from the intermediate rotor velocity to the final rotor velocity based on the rotor acceleration versus velocity schedule; and
wherein the time multiplier comprises a fraction in which:
a numerator of the fraction comprises the recalculated remaining startup duration; and
a denominator of the fraction comprises the remaining portion of the originally scheduled startup duration.

9. The method according to claim 8, further comprising the step of scaling the rotor acceleration by the time multiplier for an entirety of the duration until the final rotor velocity is achieved; and
wherein the step of scaling the rotor acceleration per the time multiplier comprises scaling the rotor acceleration versus velocity schedule by the time multiplier.

10. The method according to claim 8, further comprising the step of determining whether scaling the rotor acceleration per the time multiplier results in a violation of an operational boundary of the gas turbine.

11. The method according to claim 10, further comprising the steps of:
incrementally reducing the time multiplier until finding an adjusted value of the time multiplier that does not result in the violation of the operational boundary of the gas turbine; and
designating the adjusted value of the time multiplier as the time multiplier.

12. The method according to claim 8, further comprising the step of receiving feedback from an operator of the gas turbine that approves the scaling the rotor acceleration per the time multiplier.

13. A system comprising:
a gas turbine comprising a compressor, a combustor, and, drivingly coupled to the compressor, a turbine, wherein the turbine includes a rotor comprising a rotor velocity and a rotor acceleration during the startup sequence; and
a control system operably connected to the gas turbine for controlling an operation thereof, the control system comprising:
a hardware processor; and
a machine readable storage medium on which is stored instructions that cause the hardware processor to execute a process related to control of the gas turbine;
wherein the process comprises:
determining an originally scheduled startup duration for the gas turbine, the originally scheduled startup duration comprising a calculated duration for the startup sequence given: a) an initial rotor velocity at a beginning of the startup sequence; and b) a final rotor velocity at an end of the startup sequence;
initializing the beginning of the startup sequence by applying a startup torque to the rotor;
measuring an intermediate rotor velocity at an intermediate time within the startup sequence;
determining a recalculated remaining startup duration, wherein the recalculated remaining startup duration comprises a duration calculated as necessary to achieve the final rotor velocity given the intermediate rotor velocity;
determining a remaining portion of the originally scheduled startup duration based on the intermediate time, the remaining portion of the originally scheduled startup duration comprising the originally scheduled startup duration minus an elapsed portion thereof;
calculating a time multiplier based on a comparison of the recalculated remaining startup duration to the remaining portion of the originally scheduled startup duration; and
scaling the rotor acceleration per the time until the final rotor velocity is achieved by the turbine.

14. The system according to claim 13, wherein the originally scheduled startup duration is calculated before or concurrent with the beginning of the startup sequence.

15. The system according to claim 14, wherein the initial rotor velocity comprises a velocity of the rotor as determined at the beginning of the startup sequence;
wherein the final rotor velocity comprises a rotor velocity associated with a predetermined steady state operating condition for the gas turbine; and
wherein the intermediate time comprise one that is subsequent to the beginning of the startup sequence but before the end of the startup sequence.

16. The system according to claim 14, wherein the originally scheduled startup duration is determined via a rotor acceleration versus velocity schedule.

17. The system according to claim 16, wherein the rotor acceleration versus velocity schedule comprises a plot of rotor acceleration as a function of rotor velocity, the plot of rotor acceleration as a function of rotor velocity covering at least a continuous range of rotor velocities including at least the initial rotor velocity through the final rotor velocity.

18. The system according to claim 17, wherein the recalculated remaining startup duration is determined by calculating an amount of time required to accelerate from the intermediate rotor velocity to the final rotor velocity based on the rotor acceleration versus velocity schedule; and
wherein the time multiplier comprises a fraction in which:

a numerator of the fraction comprises the recalculated remaining startup duration; and a denominator of the fraction comprises the remaining portion of the originally scheduled startup duration.

19. The system according to claim 18, wherein the step of scaling the rotor acceleration per the time multiplier comprises scaling the rotor acceleration versus velocity schedule by the time multiplier.

20. The system according to claim 18, further comprising the step of determining whether scaling the rotor acceleration per the time multiplier results in a violation of an operational boundary of the gas turbine.

* * * * *